United States Patent
Krajnc

(10) Patent No.: US 10,867,491 B2
(45) Date of Patent: Dec. 15, 2020

(54) PRESENCE DETECTION SYSTEM AND METHOD

(71) Applicant: SIGNIFY HOLDING B.V., Eindhoven (NL)

(72) Inventor: Hugo Jose Krajnc, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 77 days.

(21) Appl. No.: 16/344,160

(22) PCT Filed: Oct. 16, 2017

(86) PCT No.: PCT/EP2017/076289
§ 371 (c)(1),
(2) Date: Apr. 23, 2019

(87) PCT Pub. No.: WO2018/077638
PCT Pub. Date: May 3, 2018

(65) Prior Publication Data
US 2020/0082689 A1    Mar. 12, 2020

(30) Foreign Application Priority Data

Oct. 24, 2016   (EP) .................................... 16195224

(51) Int. Cl.
*G08B 13/196*   (2006.01)
*H05B 47/105*   (2020.01)
*F21V 23/04*    (2006.01)

(52) U.S. Cl.
CPC ...... *G08B 13/1961* (2013.01); *F21V 23/0478* (2013.01); *H05B 47/105* (2020.01)

(58) Field of Classification Search
CPC ............. H04N 5/2226; G06K 9/00355; G06K 9/4671; G06K 7/1478; G08B 13/1961;
(Continued)

(56) References Cited

U.S. PATENT DOCUMENTS 7,308,349 B2   12/2007   Kong et al.
8,270,673 B2   9/2012    Yamamoto
(Continued)

FOREIGN PATENT DOCUMENTS

DE   19603766 A1   8/1997
JP   2020204404 A  9/2010

*Primary Examiner* — Jingge Wu

(57) ABSTRACT

A presence detection system (10) is disclosed comprising a camera module (20) comprising an image sensor (21) having a plurality of pixels (22) for capturing an image of a space (1) and a signal processor (23) arranged to process signals from each pixels in accordance with one or more configuration parameters for said pixel; and generate a setting for the image sensor from the processed signals. The system further comprises a controller (30) communicatively coupled to the signal processor and arranged to provide the signal processor with configuration parameters for the pixels based on an expected presence in a region of said image such that the pixels corresponding to said region have at least one different configuration parameter to pixels outside said region; periodically receive the setting from the signal processor; and detect a change in said presence in the space from a change in the received setting. A lighting system including such a presence detection system and a presence detection method are also disclosed.

12 Claims, 5 Drawing Sheets

(58) Field of Classification Search
CPC . H05B 47/105; H05B 47/125; F21V 23/0478; G06T 2207/30196; G06T 7/001; G06T 7/251
See application file for complete search history.

(56) References Cited

U.S. PATENT DOCUMENTS

| | | |
|---|---|---|
| 2004/0186642 A1 | 9/2004 | Basir et al. |
| 2005/0057666 A1* | 3/2005 | Hu ................... H04N 5/2351 348/229.1 |
| 2005/0157204 A1* | 7/2005 | Marks ................ H04N 5/272 348/370 |
| 2006/0082821 A1* | 4/2006 | Yamaya ............. H04N 5/772 358/1.15 |
| 2008/0181523 A1* | 7/2008 | Yoo .................... G06T 5/002 382/254 |
| 2008/0199051 A1 | 8/2008 | Seo |
| 2008/0297586 A1 | 12/2008 | Kurtz et al. |
| 2010/0033568 A1 | 2/2010 | Lee |
| 2014/0211991 A1* | 7/2014 | Stoppa ............. G06K 9/00355 382/103 |
| 2014/0211992 A1* | 7/2014 | Stoppa ............. G06K 9/4671 382/103 |
| 2016/0202678 A1 | 7/2016 | Aggarwal et al. |

* cited by examiner

FIG. 4

PRESENCE DETECTION SYSTEM AND METHOD

CROSS-REFERENCE TO PRIOR APPLICATIONS

This application is the U.S. National Phase application under 35 U.S.C. § 371 of International Application No. PCT/EP2017/076289, filed on Oct. 16, 2017, which claims the benefit of European Patent Application No. 16195224.7, filed on oct. 24, 2016. These applications are hereby incorporated by reference herein.

FIELD OF THE INVENTION

The present invention relates to a presence detection system comprising a camera module comprising an image sensor having a plurality of pixels for capturing an image of a space and a signal processor arranged to process signals from each pixel in accordance with one or more configuration parameters for said pixel.

The present invention further relates to a lighting system including such a presence detection system.

The present invention further relates to a method of detecting a presence in a space with a presence detection system using such a presence detection system.

BACKGROUND OF THE INVENTION

Several techniques are currently available to determine or detect presence of individuals in a given environment, such as for example PIR (Passive InfraRed) sensors, ultra-sound sensors, microwave radars, and so on. Presence detection can provide several benefits related to lighting or light sources as it for example can indicate whether there is an actual need to keep lights on in case of people present in a space illuminated by the lighting or whether they can be dimmed or turned off due to the absence of people in the space. This ultimately results in better energy management, which is highly desirable in current society given the commitment to tackling climate change by reducing the emission of greenhouse gases.

Such presence detection systems need to be able to accurately determine the presence of a person in the monitored space, as false positives, e.g. the detection of an individual outside the space, e.g. walking through a corridor or past a window, causing a change in luminance levels within the monitored space, can reduce the energy efficiency of a (lighting) system controlled by the presence detection system, whereas false negatives, e.g. failure to detect the presence of an individual within the monitored space, can seriously compromise user satisfaction and potentially lead to hazardous situations. For this reason, key parameters of interest for such sensors include reliability and resolution as well as size for aesthetic reasons. At least some of the aforementioned technologies struggle to meet each of these requirements, which has led to an increased interest in presence detection systems based on image sensors, e.g. CMOS imaging cameras. Such image sensors typically comprise a plurality of pixels, which may processed in groups (clusters) to reduce the computational effort required for such processing.

US2010/0033568 shows a presence detection system using camera and image processing. Successive image are compared in such a way to determine if a part of the image is moving.

US2016/0202678 shows a presence detection system using passive infra red. The sensor used in this documents is an array of sensors that enable to divide an area in several clusters that can be managed independently.

It has been demonstrated that camera modules including image sensors can be used to estimate presence of individuals in its field-of-view by analysing changes in its settings such as the overall auto-gain or auto-exposure. Such camera modules typically include internal processing elements that can detect when certain image parameters (e.g. overall brightness) have changed significantly enough to require these settings to be adjusted in order to obtain images with a desired image quality. By monitoring these parameters it is possible to estimate whether an individual has entered the camera module's field-of-view as the overall image will darken. When the internal processing unit of the camera module senses this change, the auto-gain and/or auto-exposure is adjusted accordingly and can be used as a output signal indicating presence (or lack thereof). For example, a change in auto gain value by more than a defined threshold, e.g. 50%, may indicate the presence of an individual in the space. As this methodology takes into account the full image, this can result in poor spatial resolution, which can lead to undesirable false negatives or positives as explained above.

US2008/0199051 shows a motion detecting device using a camera and image processing for comparing successive images. In this document, an auto gain of the image is used for avoiding the false detection that may result of a global reduction of the light.

SUMMARY OF THE INVENTION

The present invention seeks to provide a presence detection system comprising a camera module comprising an image sensor having a plurality of pixels for capturing an image of a space and a signal processor arranged to process signals from each pixels in accordance with one or more configuration parameters for said image sensor having increased spatial resolution.

The present invention further seeks to provide a lighting system including such a presence detection system.

The present invention further seeks to provide a method of detecting a presence in a space with a presence detection system using such a presence detection system that exhibits having increased spatial resolution.

According to an aspect, there is provided a presence detection system comprising a camera module comprising an image sensor having a plurality of pixels for capturing an image of a space and a signal processor arranged to divide said image into a plurality of clusters of saids pixels; and to process signals from each pixels of each cluster in accordance with one or more configuration parameters for said cluster; and to generate a setting for the image sensor from the processed signals, wherein the setting is an auto-gain setting or an auto exposure time setting; and a controller communicatively coupled to the signal processor and arranged to provide the signal processor with configuration parameters for the clusters based on an expected presence in a region of said image such that the clusters corresponding to said region have at least one different configuration parameter to clusters outside said region; periodically receive the setting from the signal processor; and detect a change in said presence in the space from a change in the received setting.

The present invention is based on the insight that different regions of an image captured with the camera module have a different relevance to the presence detection, which insight is leveraged by adjusting the configuration parameters for the clusters corresponding to image regions having a higher likelihood of detecting a presence such that these pixels of said clusters contribute more heavily to the setting calculated by the signal processor based on the signals produced by the pixels. In this manner, the setting computed by the camera for auto-gain control or time exposure determination is weighted to be used directly as presence detector. The spatial resolution of the presence detection system is improved with the additional benefit that the controller does not need to receive the full image from the camera module, which enhances the privacy of the presence detection system. This reduces the required computational effort, for example compared to retrieving and processing a full image, thereby increasing the reaction speed of the presence detection system.

In an embodiment, the at least one configuration parameter includes a weight factor, and the signal processor is arranged to determine an image property from each of the processed signals; generate the setting by averaging the respective determined image properties in accordance with the associated weight factor. In this manner, pixels or clusters of pixels associated with the region of interest within the image may be given greater prominence in the calculation of the full image sensor setting to achieve the desired spatial resolution.

For example, the controller may be arranged to assign a first weight factor to pixels peripheral to said image and a second weight factor to pixels central to said image, wherein the first weight factor differs from the second weight factor. The first weight factor may be higher than the second weight factor in a scenario in which no presence has yet been detected with the camera module, as the individual may enter the field of view of the image via the periphery of the image rather than via a central region of the image. Alternatively, the first weight factor may be lower than the second weight factor in a scenario where a presence is detected in the imaged space, in which case it is more likely that the individual resides in a central region of the image.

The controller may be arranged to at least partially determine a weight factor for a pixel based on a position of the image sensor within the space. For example, pixels or cluster(s) of pixels capturing a region of the space near a window may be more sensitive to false positives, e.g. by capturing the effect of someone walking past the window outside the space, in which case such pixels or clusters of pixels may be given a lower weight factor in order to reduce their importance in the averaging process from which the setting is obtained.

In a preferred embodiment, the controller is arranged to update a configuration parameter for at least some of the pixels in response to a detected change in said presence in said space. In this manner, the presence detection system may be dynamically adapted, e.g. in accordance with a defined algorithm executed by the controller, to reflect a changed region of interest in the image.

The signal processor may be adapted to derive a pixel characteristic including at least one of a luminance level, color composition and white balance from said signals and to generate said setting from the derived pixel characteristics. In some embodiments, the signal processor is adapted to generate said setting from a plurality of the derived cluster characteristics.

The controller may be external to the camera module in at least some of the embodiments, which for example may be beneficial in terms of privacy as previously explained.

In accordance with another aspect, there is provided a lighting system comprising at least one light source and the presence detection system of any of the herein described embodiments, wherein the light source is controlled by the controller in accordance with the detected change in said presence in the space. Such a lighting system benefits from the increased spatial resolution of the presence detection system by providing more accurate control of the light source(s) as a function of the presence of individuals in the space in which the lighting system is deployed.

In accordance with yet another aspect, there is provided a method of detecting a presence in a space with a presence detection system comprising a camera module including an image sensor having a plurality of pixels for capturing an image of a space and a signal processor, the method comprising dividing the plurality of pixels into clusters of pixels with the signal processor; and providing the signal processor with configuration parameters for the clusters based on an expected presence in a region of said image such that the clusters corresponding to said region have at least one different configuration parameter to clusters outside said region; processing signals from each cluster of said pixels with the signal processor in accordance with the received configuration parameters for said cluster; periodically generating a setting for the image sensor from the processed signals with the signal processor wherein the setting is an auto-gain setting or an auto exposure time setting; and detecting a change in said presence in the space from a change in the generated setting. This method ensures that a presence may be detected in a space monitored by the presence detection system with a high degree of spatial resolution as explained in more detail above. The processing signals from each cluster of said pixels with the signal processor in accordance with the provided configuration parameters, reduces the computational effort required to obtain the presence detection by using internal setting of the camera.

Preferably, the at least one different configuration parameter includes a weight factor, and the method further comprises determining an image property from the received signals with the signal processor, and wherein generating the setting comprises averaging the respective determined image properties in accordance with the associated weight factor, such that pixels or pixel clusters associated with the region of interest within the image are more heavily considered when determining the setting, thereby improving the spatial resolution of the presence detection.

In another preferred embodiment, the method further comprises updating a configuration parameter for at least some of the pixels in response to a detected change in said presence in said space, thereby dynamically adapting the presence detection to changed presence conditions within the space.

BRIEF DESCRIPTION OF THE DRAWINGS

Embodiments of the invention are described in more detail and by way of non-limiting examples with reference to the accompanying drawings, wherein:

FIG. 4 schematically depicts an operational aspect of the presence detection system in FIG. 3.

DETAILED DESCRIPTION OF THE EMBODIMENTS

Figure 1:
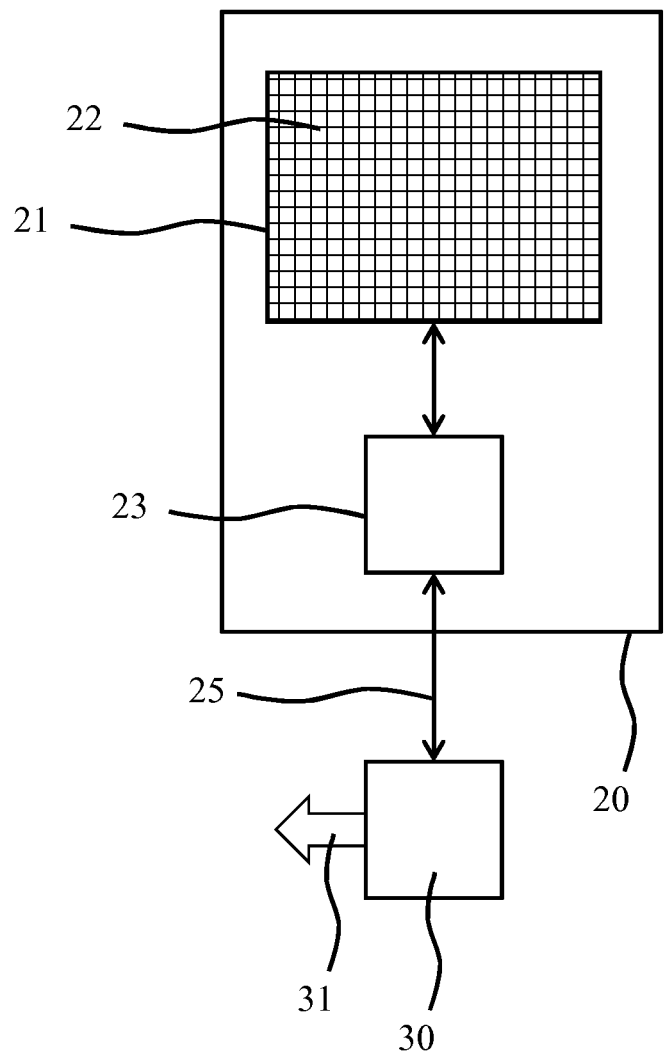
FIG. 1 schematically depicts a presence detection system according to an embodiment.

It should be understood that the Figures are merely schematic and are not drawn to scale. It should also be understood that the same reference numerals are used throughout the Figures to indicate the same or similar parts.

FIG. 1 schematically depicts a presence detection system 10 according to an embodiment of the present invention. The presence detection system 10 comprises a camera module 20 and a controller 30, which controller 30 may be external to the camera module 20. For example, the controller 30 may be communicatively coupled to the camera module 20 via a communication link 25, which may be a wired link or a wireless link. The communication link 25 may be a dedicated link or may be a network link, in which case the camera module 20 may be identifiable to the controller 30 by means of a network address, e.g. an IP address or the like. The camera module 20 may comprise an image sensor 21, e.g. a CMOS sensor, a CCD sensor, or the like, which image sensor 21 typically comprises a plurality of pixels 22 that define a field of view of the image sensor 21. The camera module 20 may further comprise a signal processor 23 adapted to process the signals generated with the pixels 22 as to determine a setting of the image sensor 21.

As is well-known per se, such a signal processor 23 may for example determine an auto-gain setting or an auto-exposure time setting for the camera module 20 based on the signals received from the pixels 22. More specifically, the signal processor 23 may determine a brightness or luminance level for each of the pixels and average the determined brightness or luminance levels in order to obtain an image property, e.g. an image-averaged brightness or luminance level, based on which the signal processor 23 may determine a setting for the camera module 20, e.g. an auto-gain setting or an auto-exposure time setting, in order to ensure that an image captured with the image sensor 21 is of a desired quality, e.g. has a desired luminance or contrast level.

The signal processor 23 may be adapted to process the pixels signals in digital form. To this end, the signal processor 23 may include an analog to digital (AD) converter to convert the analog signals from the pixels 22 into a digital representation. Alternatively, the camera module 20 may comprise a separate AD converter in between the image sensor 21 and the signal processor 23.

In an embodiment, the signal processor 23 is configured to define groups or clusters of pixels 22 and to process the signals from the image sensor 21 at the cluster level, in order to reduce the computational effort required to determine the image sensor setting(s). To this end, the image sensor 21 for example may be adapted to average the signals from the pixels 22 within a cluster and use the cluster-averaged signals for the calculation of the settings. For example, the image sensor 21 may calculate an average luminance or brightness level for each cluster and determine the image-averaged luminance or brightness level from the cluster-averaged luminance or brightness levels.

Although not explicitly shown, the camera module 20 may further comprise one or more optical elements, e.g. lenses or the like, to shape the field of view of the camera module 20, i.e. the image sensor 21. This is well-known per se and is therefore not explained in further detail for the sake of brevity only.

The controller 30 may be any suitable controller, e.g. a dedicated controller such as a dedicated microcontroller, a general purpose processor programmed to implement the desired control functionality, e.g. a processor of a computer such as a personal computer, tablet computer, laptop computer, network-connected server implementing a particular service or the like, and so on. The controller 30 is typically adapted to provide the signal processor 23 with configuration parameters for the pixels 22 or clusters of pixels 22, which configuration parameters are used by the signal processor 23 to calculate the aforementioned setting(s) of the camera module 20. Such configuration parameters for example may be used to parameterise a function implemented by the signal processor 23 for processing the signals from the pixels 22 or clusters of pixels 22.

In response, the signal processor 23 periodically provides the controller 30 with the setting of interest calculated from the signals received from the pixels 22, which as previously explained may be combined into cluster-averaged signals for the sake of computational efficiency. Any suitable period for calculating the setting and forwarding it to the controller 30 may be deployed by the signal processor 23, e.g. a calculation frequency of 0.1 Hz or higher, 1 Hz or higher or 10 Hz or higher. Other suitable frequencies will be immediately apparent to the skilled person. The controller 30 may generate a signal 31 indicative of a change in a presence in a space in which the camera module 20 is located upon detecting a change in the setting of interest received from the signal processor 23. To this end, the controller 30 may be adapted to compare the latest received setting with the previously received setting to detect such a change. The change in presence may be a change from a state in which an individual is absent in the space to a state in which at least one individual is present in the space. In other words, the controller 30 may implement a finite state machine defining different states of occupancy of the space in which the camera module 20 is located, with each detected change in the setting received from the signal processor 23 causing a transition between states of the finite state machine.

Figure 2:
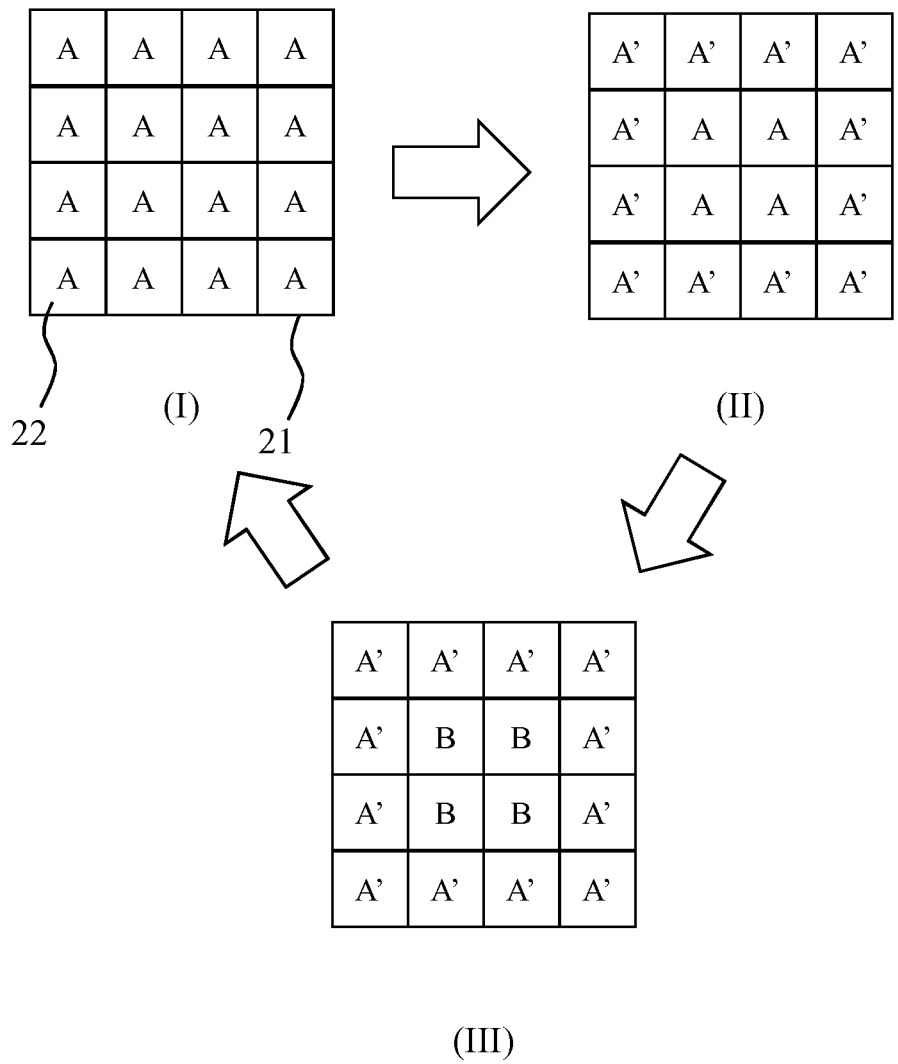
FIG. 2 schematically depicts an operational aspect of a presence detection system according to an embodiment.

This is explained in more detail with the aid of FIG. 2, which schematically depicts an operating principle of the presence detection system 10 according to at least some embodiments of the present invention. FIG. 2 schematically depicts three different configurations I, II and III of clusters 24 of pixels 22 as specified by configuration parameters provided to the signal processor 23 by the controller 30. In configuration (I), each cluster 24 is configured with the same set of configuration parameters, labelled A, with each set of configuration parameters comprising at least one configuration parameter. In an example embodiment, each set of configuration parameters includes a weight factor for the cluster-averaged signal or property, e.g. an averaged luminance or brightness level in case of the calculation of an auto-gain setting or auto-exposure time setting for the camera module 20 with the signal processor 23, which weight factor is applied to the signal processor 23 in calculating the image-averaged signal or property from which the setting is derived.

A drawback of configuration (I) is that because all pixels 22 or pixel clusters 24 are treated in the same manner, i.e. are configured with the same set of configuration parameters, the image-averaged signal or property can lack sufficient spatial resolution in order to accurately determine the presence or absence of an individual within a space in which the camera module 20 is positioned. This for example makes it difficult to distinguish between random fluctuations in the image-averaged signal caused by noise events, e.g. daylight fluctuations, an individual outside the space walking past an external window of the space, and so on, and fluctuations in the image-averaged signal caused by changes in occupancy of the space.

An important insight on which at least some embodiments of the present invention are based is that depending on the occupancy state of the space monitored by the camera module 20, specific regions of the image captured with the image sensor 21 are more likely to capture a change in the occupancy compared to other regions of the image. For example, configuration (II) reflects an occupancy state in which the space monitored by the camera module 20 does not contain any individuals. Consequently, if an individual is to enter the space, the most likely point of entry as captured in the image captured with the image sensor 21 is in the periphery of the image. Therefore, the controller 30, when being in a state corresponding to this occupancy state, may provide the signal processor 23 with configuration parameters such that the signals, e.g. the properties derived from these signals, of the pixels 22 or pixel clusters 24 in the periphery of the image more heavily contribute to the calculation of the setting(s). This is schematically depicted by the clusters 24 in configuration (II) in a central region of the image being labelled A and the clusters 24 in configuration (II) in a peripheral region of the image being labelled A', with A' signalling a higher contribution to the averaging function on which the signal processor 23 is to base the determination of the setting for the camera module 20.

In an embodiment, the controller 30 is adapted to instruct the signal processor 23 to assign a first weight factor to pixels 22, e.g. pixel clusters 24, peripheral to the image and a second weight factor to pixels 22, e.g. pixel clusters 24, central to the image, wherein the first weight factor differs from the second weight factor. Specifically, in configuration (II), the first weight factor is higher than the second weight factor.

The signal processor 23 will typically periodically generate the settings for the camera module 20 based on the signals received from the pixels 22, optionally based on cluster-averaged signals as previously explained, and provide the controller 30 with the generated settings. As long as the controller 30 does not detect a change in the settings, e.g. a change exceeding a defined threshold, which threshold may be defined such that noise artefacts triggering small changes in the settings can be ignored, the signal processor 23 will continue to generate the settings based on the sets of configuration parameters previously provided by the controller 30, as the likelihood of initial detection of a presence in the space monitored by the camera module 20 in the periphery of the image captured with the image sensor 21 has not changed.

However, upon detecting a (significant) change in the settings, the controller 30 may generate the control signal 31 as previously explained and may update at least some of the configuration parameters assigned to the pixels 22 or pixel clusters 24. This is schematically depicted by the transition between configuration (II) and configuration (III), in which the configuration parameters assigned to the pixels 22 or pixel clusters 24 in the central region of the image have been changed from A to B. This is because the controller 30 has now transitioned to a new state in which it is likely that the individual that has entered the space as detected in the periphery of the image captured with the image sensor 21 has moved to a central region of the space as detected in the central region of the image captured with the image sensor 21, such that the presence of this individual may be accurately tracked based on the settings calculated by the signal processor 23 by giving more prominence, e.g. more weight, to the pixels 22 or pixel clusters 24 responsible for capturing the central portion of the image. In this manner, by giving more prominence to the pixels 22 or pixel clusters 24 in the calculation of these settings with the signal processor 23 that are associated with regions of the image in which the detection of the presence of an individual is more likely, an increased spatial resolution of the presence detection based on detected changes in the calculated settings, e.g. auto-gain settings or auto-exposure time settings, is achieved.

Figure 3:
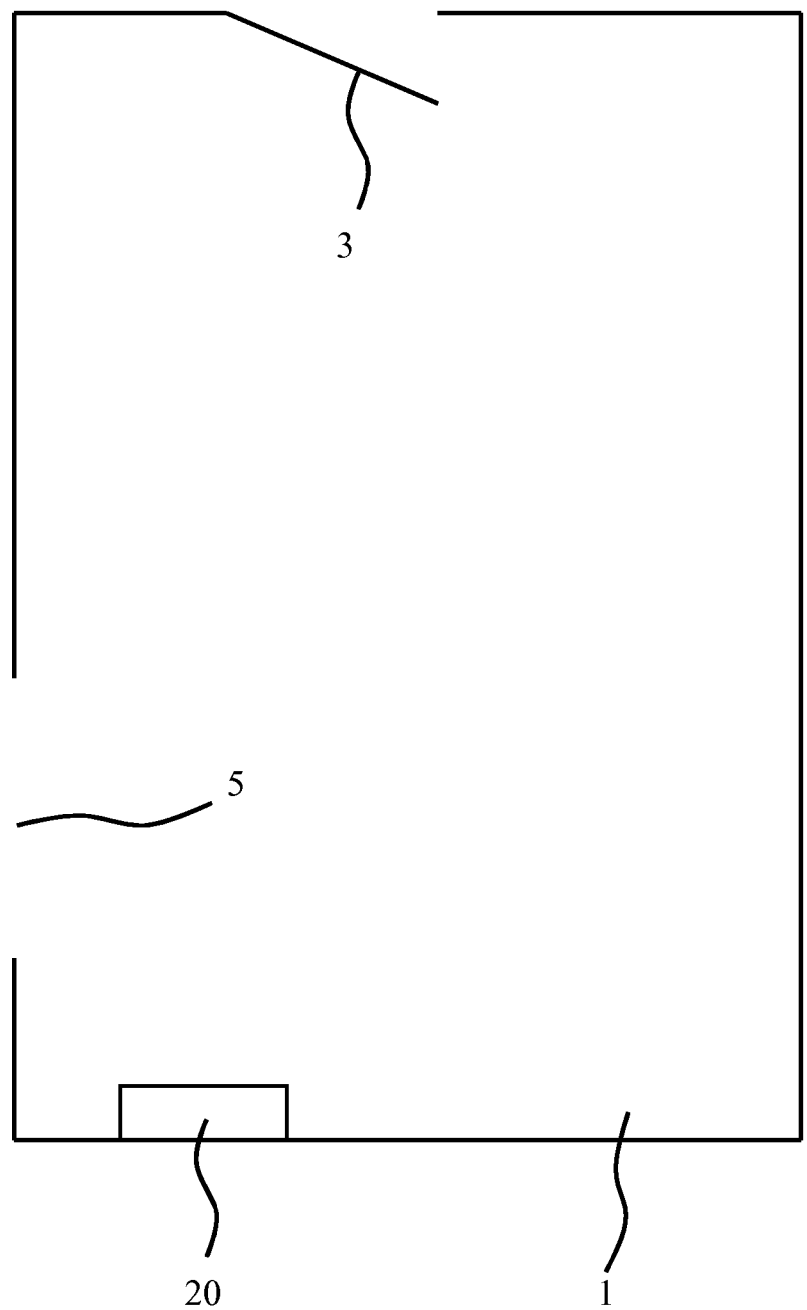
FIG. 3 schematically depicts an aspect of a presence detection system according to an embodiment positioned in a space.

Alternative or in addition to such dynamic changes to the configuration parameters provided to the signal processor 23 by the controller 30 as a function of occupancy state of the space in which the camera module 20 is positioned, the controller 30 may be adapted to base such configuration parameters on environmental conditions within the space. This is explained in more detail with the aid of FIG. 3, which schematically depicts the positioning of the camera module 20 in a space 1 comprising an external window 3 and a door 5. The controller 30 may be provided with positioning information of such features of the space 1 within the image captured with the image sensor 21 of the camera module and at least partially base the configuration parameters for the respective pixels 22 or pixel clusters 24 to be deployed by the signal processor 23 on such positioning information.

Figure 4:
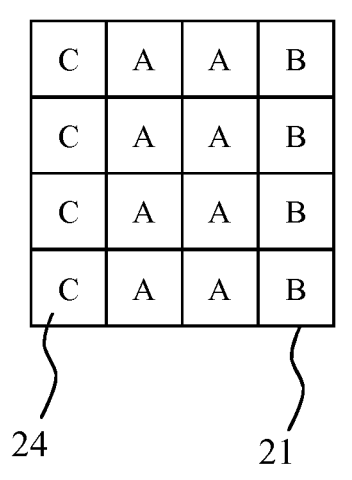

For example, the controller 30 may reduce the relevance of the pixels 22 or pixel clusters 24 that capture or are influenced by the external window 3 in the calculation of the setting for the camera module 20 by the signal processor 23, e.g. by assigning a lower weight factor to these pixels 22 or pixel clusters 24, because it is likely that the external window 3 is a source of noise, for example by fluctuations in luminance levels caused by changes in daylight levels or by a passer-by walking past the window. Similarly, the controller 30 may increase the relevance of the pixels 22 or pixel clusters 24 that capture the door 5 in the calculation of the setting for the camera module 20 by the signal processor 23, e.g. by assigning a higher weight factor to these pixels 22 or pixel clusters 24, because it is likely that a change in occupancy of the space 1 will occur by an individual entering or leaving the space 1 through the door 5. This is exemplified in FIG. 4, in which a map of sets of configuration parameters assigned to the pixel clusters 24 of the image sensor 21 by the controller 30 and to be deployed by the signal processor 23 in the calculation of the setting(s) of the camera module 20 is schematically depicted. Three different sets A, B, C of configuration parameters have been assigned by the controller 30, with set A having the highest relevance, e.g. the highest weight factor, as these pixel clusters 24 capture the door 5 in the space 1 and set C having the lowest relevance, e.g. the lowest weight factor, as these pixel clusters 24 capture or are influenced by the external window 3 in the space 1.

The controller 30 may be programmed to contain such environmental information, e.g. by an installer of the camera module 20, or alternatively, the controller 30 may be adapted to derive such environmental information from the processed pixel or pixel clusters signals. In the latter scenario, the signal processor 23 may be adapted to provide the controller 30 with the processed pixel or pixel clusters signals, with the controller 30 adapted to evaluate these signals over time, e.g. in order to determine pixels or pixel clusters sensitive to noise or most likely to capture the presence of an individual than in the space 1.

At this point, it is noted that embodiments of the present invention are not limited to weighted averages, but may be applied to any parameterised calculation performed by the signal processor 23 on the signals of the respective pixels 22 or pixel clusters 24.

For example, a combination of configuration parameters, e.g. including weight factors, may be used to configure respective pixels 22. In addition, the calculation of the setting of the camera module may be supplemented with an evaluation of the change in image property for a pixel 22 or pixel cluster 24 level, where, if a pixel 22 or pixel cluster 24 exists exhibiting a change in the image property, e.g. gain, exceeding a defined threshold, a presence in the space 1 may be concluded regardless of the change in overall setting of the camera module 20. Or, in a scenario where certain pixels 22 or pixel clusters 24 have been given a low weight factor to limit the amount of false positives that can be triggered, e.g. by someone walking past an external side of a glass wall, detection of an individual in a region of the space 1 captured by these pixels 22 or pixel clusters 24 may be achieved by increasing the weight factor of these pixels 22 or pixel clusters 24, e.g. with the signal processor 23, in case the change in image property exceeds such a (very high) threshold.

In an embodiment of the present invention, the signal processor 23 is adapted to derive a pixel characteristic such as a luminance level, color composition and white balance from the signals provided by the pixels 22 and to generate the setting from the derived pixel characteristics. As previously explained, such pixel characteristics may be cluster-averaged pixel characteristics in which case the setting is generated from the cluster-averaged pixel characteristics. Although in some embodiments the pixel characteristic is a luminance level, in alternative embodiments the pixel characteristic may for example be a colour composition or white balance, for example in a scenario where a presence cannot be accurately detected by a change in luminance level, such as a scenario in which a person wearing white clothes walks past a white wall. To this end, the signal processor 23 may determine each of a plurality of pixel characteristics and base the calculation of the setting of the camera module 20 on a combination of these calculated pixel characteristics to further enhance the spatial resolution of the presence detection system 10, as in such embodiments there is a reduced risk that the presence of a person within the space 1 will go unnoticed because multiple pixel characteristics are being considered.

The presence detection system 10 according to an embodiment of the present invention may be included in a lighting system comprising at least one light source, e.g. at least one luminaire, in which the presence detection system 10 is configured such that the control signal 31 generated with the controller 30 is used to control the at least one light source, e.g. control a dimming level of the at least one light source or to switch on or off the at least one light source. As will be readily understood by the skilled person, the at least one light source may be directly responsive to the control signal 31 or alternatively the lighting system may include a further controller responsive to the control signal 31, which further controller controls the at least one light source, e.g. controls a dimming level or on/off state of the at least one light source.

Figure 5:
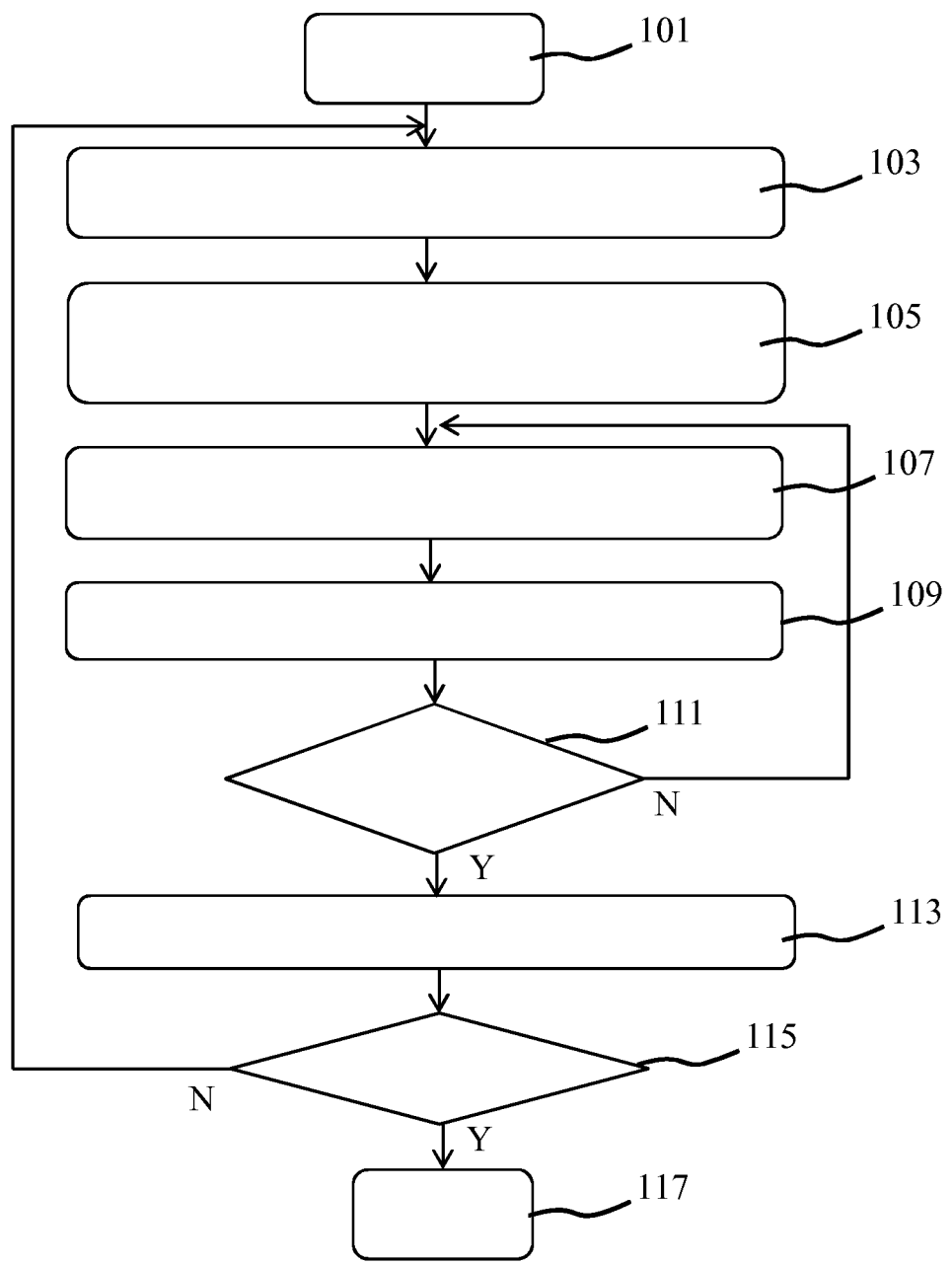
FIG. 5 is a flow chart of a presence detection method according to an embodiment.

A flowchart of an example embodiment of a method 100 of detecting a presence in a space 1 with a presence detection system 10 according to embodiments of the present invention is depicted in FIG. 5. The method 100 starts in 101, for example by powering up the presence detection system 10, after which the method 100 proceeds to 103 in which the signal processor 23 is provided with configuration parameters for the pixels based on an expected presence in a region of said image such that the pixels corresponding to said region have at least one different configuration parameter to pixels outside this region as explained in more detail above. These configuration parameters may be provided by the controller 30 as will be understood from the foregoing. In at least some embodiments, the at least one different configuration parameter includes a weight factor.

Next, the method 100 proceeds to 105 in which the signal processor 23 is configured in accordance with the received configuration parameters after which the signal processor 23 receives signals from the pixels 22 in 107 and processes these signals in accordance with the received configuration parameters, e.g. the received weight factors. This for example may include determining an image property such as a luminance level, colour composition and/or white balance. This processing may include the calculation of an averaged image property for a cluster 24 of pixels 22 as previously explained.

In 109, the signal processor 23 periodically generates a setting for the camera module 20, i.e. for the image sensor 21 from the processed signals and forwards the generated setting to the controller 30, which controller checks the received setting in 111 against the previously received setting in order to detect a change in the presence (occupancy) in the space 1 from a change in the generated setting. If no such change is detected, the method 100 may revert back to 107 for example. On the other hand, if such a change is detected, the method 100 may proceed to 113 in which the controller 30 generates the control signal 31 after which it may be decided in 115 if the method 100 may be terminated. For example, the method 100 may be terminated in case the controller 30 deploys static configuration parameters only, i.e. configuration parameters associated with a fixed region within the image captured with the image processor 21. However, in a preferred embodiment, the controller 30 may wish to update the configuration parameters for at least some of the pixels 22 or pixel clusters 24 in response to detect a change in the presence within the space 1, in which case the method 100 may revert back to 103 in which the signal processor 23 is provided with the updated configuration parameters, e.g. to reflect the controller 30 having entered a different state as explained in more detail above. Finally, upon completion of the presence detection method 100, the method may terminate in 117.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A presence detection system comprising:
a camera module comprising an image sensor having a plurality of pixels for capturing an image of a space and a signal processor arranged to:
divide said image into a plurality of clusters of said pixels; and
process signals from each pixels of each cluster in accordance with one or more configuration parameters for said cluster; and
generate a setting for the image sensor from the processed signals wherein the setting is an auto-gain setting or an auto-exposure time setting; and
a controller communicatively coupled to the signal processor and arranged to:
provide the signal processor with configuration parameters for the clusters based on an expected presence in a region of said image such that the clusters corresponding to said region have at least one different configuration parameter to clusters outside said region;
periodically receive the setting from the signal processor; and
detect a change in said presence in the space from a change in the received setting.

2. The presence detection system of claim 1, wherein the at least one configuration parameter includes a weight factor, and the signal processor is arranged to:
determine an image property from each of the processed signals;
generate the setting by averaging the respective determined image properties in accordance with the associated weight factor.

3. The presence detection system of claim 2, wherein the controller is arranged to assign a first weight factor to pixels peripheral to said image and a second weight factor to pixels central to said image, wherein the first weight factor differs from the second weight factor.

4. The presence detection system of claim 1, wherein the controller is arranged to at least partially determine a weight factor for a pixel based on a position of the image sensor within the space.

5. The presence detection system of claim 1, wherein the controller is arranged to update a configuration parameter for at least some of the pixels in response to a detected change in said presence in said space.

6. The presence detection system of claim 1, wherein the signal processor is adapted to derive a pixel characteristic including at least one of a luminance level, color composition and white balance from said signals and to generate said setting from the derived cluster characteristics.

7. The detection system of claim 6, wherein the signal processor is adapted to generate said setting from a plurality of the derived cluster characteristics.

8. The presence detection system of claim 1, wherein the controller is external to the camera module.

9. A lighting system comprising at least one light source and the presence detection system of claim 1, wherein the light source is controlled by the controller in accordance with the detected change in said presence in the space.

10. A method of detecting a presence in a space with a presence detection system comprising a camera module including an image sensor having a plurality of pixels for capturing an image of a space and a signal processor, the method comprising:
dividing said image into a plurality of clusters of pixels with the signal processor; and
providing the signal processor with configuration parameters for the clusters based on an expected presence in a region of said image such that the clusters corresponding to said region have at least one different configuration parameter to clusters outside said region;
processing signals from each cluster of said pixels with the signal processor in accordance with the received configuration parameters for said cluster;
periodically generating a setting for the image sensor from the processed signals with the signal processor wherein the setting is an auto-gain setting or an auto-exposure time setting; and
detecting a change in said presence in the space from a change in the generated setting.

11. The method of claim 10, wherein the at least one different configuration parameter includes a weight factor, and the method further comprises determining an image property from the received signals with the signal processor, and wherein generating the setting comprises averaging the respective determined image properties in accordance with the associated weight factor.

12. The method of claim 10, further comprising updating a configuration parameter for at least some of the pixels in response to a detected change in said presence in said space.

* * * * *